E. B. HYDE.
RIDING ATTACHMENT FOR HARROWS.
APPLICATION FILED SEPT. 21, 1918.
1,295,990.
Patented Mar. 4, 1919.
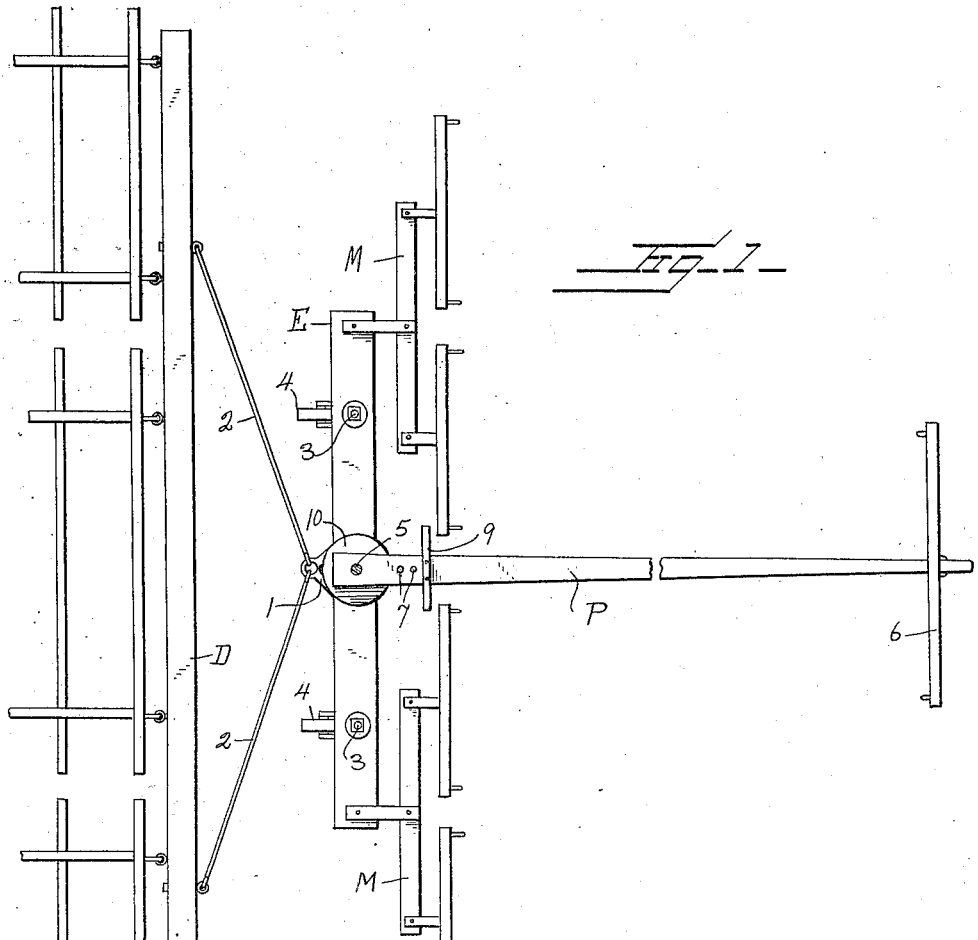
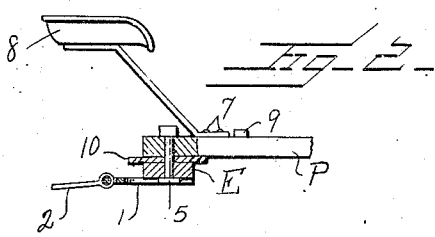
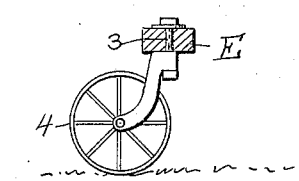
Inventor
E. B. Hyde

UNITED STATES PATENT OFFICE.

EDWARD B. HYDE, OF CROFTON, NEBRASKA.

RIDING ATTACHMENT FOR HARROWS.

1,295,990.  Specification of Letters Patent.  Patented Mar. 4, 1919.

Application filed September 21, 1918. Serial No. 255,045.

*To all whom it may concern:*

Be it known that I, EDWARD B. HYDE, a citizen of the United States, residing at Crofton, in the county of Knox and State of Nebraska, have invented certain new and useful Improvements in Riding Attachments for Harrows, of which the following is a specification, reference being had to the accompanying drawings.

This invention relates to certain improvements in riding attachments for harrows and it is an object of the invention to provide a novel and improved device of this general character which is adapted to be positioned in advance of the harrow so that the driver is positioned in close proximity to the draft animals and so that the soil is worked behind the attachment whereby the formation of runs or ditches is obviated as a result of the tracks produced by the supporting wheels of the attachment.

The invention consists in the details of construction and in the combination and arrangement of the several parts of my improved riding attachment for harrows whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings, wherein:

Figure 1 is a view in top plan illustrating a riding attachment constructed in accordance with my invention and in applied position with the seat structure omitted;

Fig. 2 is a fragmentary view partly in side elevation and partly in section illustrating the connection between the pole and evener bar and also showing the seat structure; and Fig. 3 is a fragmentary view partly in elevation and partly in section illustrating the mounting of one of the ground engaging wheels as herein disclosed.

As disclosed in the accompanying drawings D denotes a draw bar to which the harrow sections H are connected in a conventional manner. E denotes an evener bar positioned in advance of the draw bar D and which is provided midway its length with the rearwardly directed clevis 1 to which the connecting members 2 leading from the bar D are connected. In swivel engagement with the opposite end portions of the evener bar E are the vertically disposed shanks 3 having operatively engaged with their lower extremities the ground engaging wheels 4. The extremities of the evener bar E outwardly of the shanks 3 have also engaged therewith in a conventional manner the hitching members M preferably consisting of double trees.

Substantially midway its length the evener bar E has secured thereto by the king bolt 5 the forwardly directed tongue or pole P provided at its outer end with a neck yoke 6 of any desired type. The inner end portion of the pole P has bolted thereto, as at 7, a seat structure 8. It will be self-evident that the particular mounting for the wheel 4 as afforded by the shanks 3 readily permit a short stop or sharp turn during a working operation, and it will also be self-evident that the attachment of the evener bar E with the draw bar D is such as to prevent the binding of the harrow H. It will also be self-evident that by having the bar E positioned in advance of the bar D, any tracks formed in the ground by the wheels 4 will be obliterated by the harrow sections H traveling therebehind so that the possibility of deep runs or ditches forming is obviated. It will also be self-evident that by having the seat structure S positioned as hereinbefore set forth the draft animals can be handled with greater facility, and it will also be noted that the harrow sections H may readily adjust themselves to a side hill as this is rendered possible in view of the fact that the weight of the driver is in no way imposed upon the harrow sections or the bar D.

As is clearly illustrated in Fig. 2, the seat structure 8 is anchored to the pole P in advance of the king bolt 5 and the transversely disposed foot rest 9 is also anchored to the pole P in advance of but in close proximity to the seat structure 8.

Interposed between the plate P and the evener bar E is a circular plate 10, preferably of steel, through the axial center of which the king bolt 5 is directed. This plate 10 serves as a turn plate which permits the evener bar E to have free action.

From the foregoing description it is thought to be obvious that a riding attachment for harrows constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A riding attachment for a harrow comprising an evener bar adapted to be coupled with the draw bar of the harrow, ground engaging wheels carried by the outer ends of the evener bar and in swivel connection with the evener bar, a forwardly directed pole carried by the evener bar substantially midway thereof, a seat structure carried by the inner end portion of the pole, and hitching members engaged with the outer ends of the evener bar.

2. A riding attachment for a harrow comprising an evener bar adapted to be coupled with the draw bar of the harrow, ground engaging wheels carried by the outer ends of the evener bar and in swivel connection with the evener bar, a forwardly directed pole carried by the evener bar substantially midway thereof, a seat structure carried by the inner end portion of the pole, hitching members engaged with the outer ends of the evener bar, and a neck yoke carried by the outer end of the pole.

3. A riding attachment for a harrow comprising an evener bar adapted to be coupled with the draw bar of the harrow, ground engaging wheels carried by the outer ends of the evener bar and in swivel connection with the evener bar, a forwardly directed pole carried by the evener bar substantially midway thereof, a seat structure carried by the inner end portion of the pole, hitching members engaged with the outer ends of the evener bar, and a king bolt connecting the pole and evener bar.

In testimony whereof I hereunto affix my signature in the presence of two witnesses.

E. B. HYDE.

Witnesses:
J. A. LISTER,
GEO. E. MEYER.

Copies of this patent may be obtained for five cents each, by addressing the "Commissioner of Patents, Washington, D. C."